(12) United States Patent
Yamazaki et al.

(10) Patent No.: US 12,535,445 B2
(45) Date of Patent: Jan. 27, 2026

(54) SENSOR AND GAS CONVERSION SYSTEM

(71) Applicant: KABUSHIKI KAISHA TOSHIBA, Tokyo (JP)

(72) Inventors: Hiroaki Yamazaki, Yokohama Kanagawa (JP); Ping Wang, Fujisawa Kanagawa (JP)

(73) Assignee: Kabushiki Kaisha Toshiba, Kawaski (JP)

( * ) Notice: Subject to any disclaimer, the term of this patent is extended or adjusted under 35 U.S.C. 154(b) by 336 days.

(21) Appl. No.: 18/172,456

(22) Filed: Feb. 22, 2023

(65) Prior Publication Data
US 2024/0077443 A1    Mar. 7, 2024

(30) Foreign Application Priority Data

Sep. 7, 2022    (JP) .................................. 2022-142408

(51) Int. Cl.
G01N 27/18    (2006.01)
(52) U.S. Cl.
CPC .................................... G01N 27/18 (2013.01)
(58) Field of Classification Search
CPC ...................................................... G01N 27/18
See application file for complete search history.

(56) References Cited

U.S. PATENT DOCUMENTS

| | | | | |
|---|---|---|---|---|
| 4,706,061 | A * | 11/1987 | Johnson | G01N 27/18 428/137 |
| 5,619,144 | A * | 4/1997 | Stormbom | G01N 27/18 324/443 |
| 8,310,016 | B2 * | 11/2012 | Stetter | B81B 3/0021 257/415 |

(Continued)

FOREIGN PATENT DOCUMENTS

| | | |
|---|---|---|
| JP | 2009-281838 A | 12/2009 |
| JP | 2012-233776 A | 11/2012 |

(Continued)

OTHER PUBLICATIONS

Japan Patent Office, Office Action in JP App. No. 2022-142408 (Jun. 23, 2025).

(Continued)

*Primary Examiner* — David J Bolduc
(74) *Attorney, Agent, or Firm* — Finnegan, Henderson, Farabow, Garrett & Dunner, LLP

(57) ABSTRACT

According to one embodiment, a sensor includes a base, first to third detection parts. The base includes first to third base regions. The first detection part includes a first detection element. A first gap is provided between the first base region and the first detection element. The second detection part includes a second detection element. A second gap is provided between the second base region and the second detection element. The third detection part includes a third detection element. The third detection element includes a third resistance member, a third other resistance member, and a third conductive member. The third conductive member is between the third resistance member and the third other resistance member. A third gap is provided between the third base region and the third detection element.

24 Claims, 15 Drawing Sheets

(56) References Cited

U.S. PATENT DOCUMENTS

| | | | | |
|---|---|---|---|---|
| 2003/0033861 | A1* | 2/2003 | Eisenschmid | G01N 27/18 73/61.76 |
| 2005/0254547 | A1* | 11/2005 | Zribi | B82Y 15/00 374/10 |
| 2006/0047474 | A1* | 3/2006 | Hyde | G01N 27/18 702/182 |
| 2007/0131567 | A1* | 6/2007 | Park | G01N 27/18 205/784.5 |
| 2007/0262359 | A1* | 11/2007 | Hyde | G01N 27/18 714/E11.207 |
| 2010/0055801 | A1* | 3/2010 | Yi | G01N 27/18 422/90 |
| 2011/0107816 | A1* | 5/2011 | Barth | G01N 30/66 73/25.03 |
| 2011/0185789 | A1* | 8/2011 | Ooishi | G01N 33/225 73/25.03 |
| 2012/0103057 | A1* | 5/2012 | Kimata | G01N 15/0656 73/23.33 |
| 2012/0200388 | A1* | 8/2012 | Miura | H03K 17/962 324/679 |
| 2013/0065146 | A1* | 3/2013 | Ooishi | G01N 33/225 702/24 |
| 2013/0259084 | A1 | 10/2013 | Ooishi | |
| 2013/0298638 | A1* | 11/2013 | Watanabe | G01N 27/18 73/23.31 |
| 2014/0069205 | A1 | 3/2014 | Yamamoto et al. | |
| 2014/0076024 | A1* | 3/2014 | Duraffourg | G01N 30/66 73/23.4 |
| 2015/0097260 | A1* | 4/2015 | Tu | G01N 27/18 257/467 |
| 2015/0226713 | A1* | 8/2015 | Ruellan | G01N 27/18 73/23.4 |
| 2015/0377813 | A1* | 12/2015 | Biancolillo | B81B 7/02 257/467 |
| 2017/0350841 | A1* | 12/2017 | Chana | G01N 33/2847 |
| 2017/0363589 | A1* | 12/2017 | Kumar | G01N 33/497 |
| 2018/0156747 | A1* | 6/2018 | Le Neel | G01N 27/18 |
| 2018/0292338 | A1* | 10/2018 | Liu | G01N 27/04 |
| 2019/0041347 | A1* | 2/2019 | Matsukura | G01N 27/4077 |
| 2019/0107502 | A1* | 4/2019 | Carr | G01N 27/18 |
| 2019/0293590 | A1* | 9/2019 | Merz | G01N 27/123 |
| 2019/0353607 | A1* | 11/2019 | Kaita | G01N 27/028 |
| 2020/0080951 | A1* | 3/2020 | Nakano | G01N 27/18 |
| 2021/0003525 | A1* | 1/2021 | Kaita | G01N 33/006 |
| 2021/0088464 | A1* | 3/2021 | Rabe | G01N 27/123 |
| 2021/0116281 | A1* | 4/2021 | Udrea | G01F 1/7084 |
| 2021/0123876 | A1* | 4/2021 | Carr | G01N 27/18 |
| 2021/0181135 | A1* | 6/2021 | Santoro, Jr. | G01N 27/18 |
| 2021/0262959 | A1* | 8/2021 | Aoki | G06F 30/367 |
| 2021/0270653 | A1 | 9/2021 | Nelson et al. | |
| 2021/0293735 | A1* | 9/2021 | Matsuo | G01N 27/18 |
| 2022/0018820 | A1* | 1/2022 | Hiramatsu | G01N 27/228 |
| 2022/0107285 | A1* | 4/2022 | Tanabe | G01N 27/18 |
| 2022/0317078 | A1* | 10/2022 | Mueller | G01N 33/0027 |
| 2022/0341864 | A1* | 10/2022 | Nojiri | G01N 27/12 |
| 2023/0361325 | A1* | 11/2023 | Fuchs | H01M 8/0444 |

FOREIGN PATENT DOCUMENTS

| | | | | |
|---|---|---|---|---|
| JP | 2013-205105 A | | 10/2013 | |
| JP | 2020-148677 A | | 9/2020 | |
| JP | 2021-532375 A | | 11/2021 | |
| WO | WO-2021078449 A1 | * | 4/2021 | G01N 33/0027 |

OTHER PUBLICATIONS

Japan Patent Office, Office Action in JP App. No. 2022-142408 (Aug. 28, 2025).

* cited by examiner

SENSOR AND GAS CONVERSION SYSTEM

CROSS-REFERENCE TO RELATED APPLICATIONS

This application is based upon and claims the benefit of priority from Japanese Patent Application No. 2022-142408, filed on Sep. 7, 2022; the entire contents of which are incorporated herein by reference.

FIELD

Embodiments described herein relate generally to a sensor and a gas conversion system.

BACKGROUND

For example, there are sensors using MEMS (Micro Electro Mechanical Systems) elements. It is desired to improve the characteristics of the sensor.

DETAILED DESCRIPTION

Figure 1:
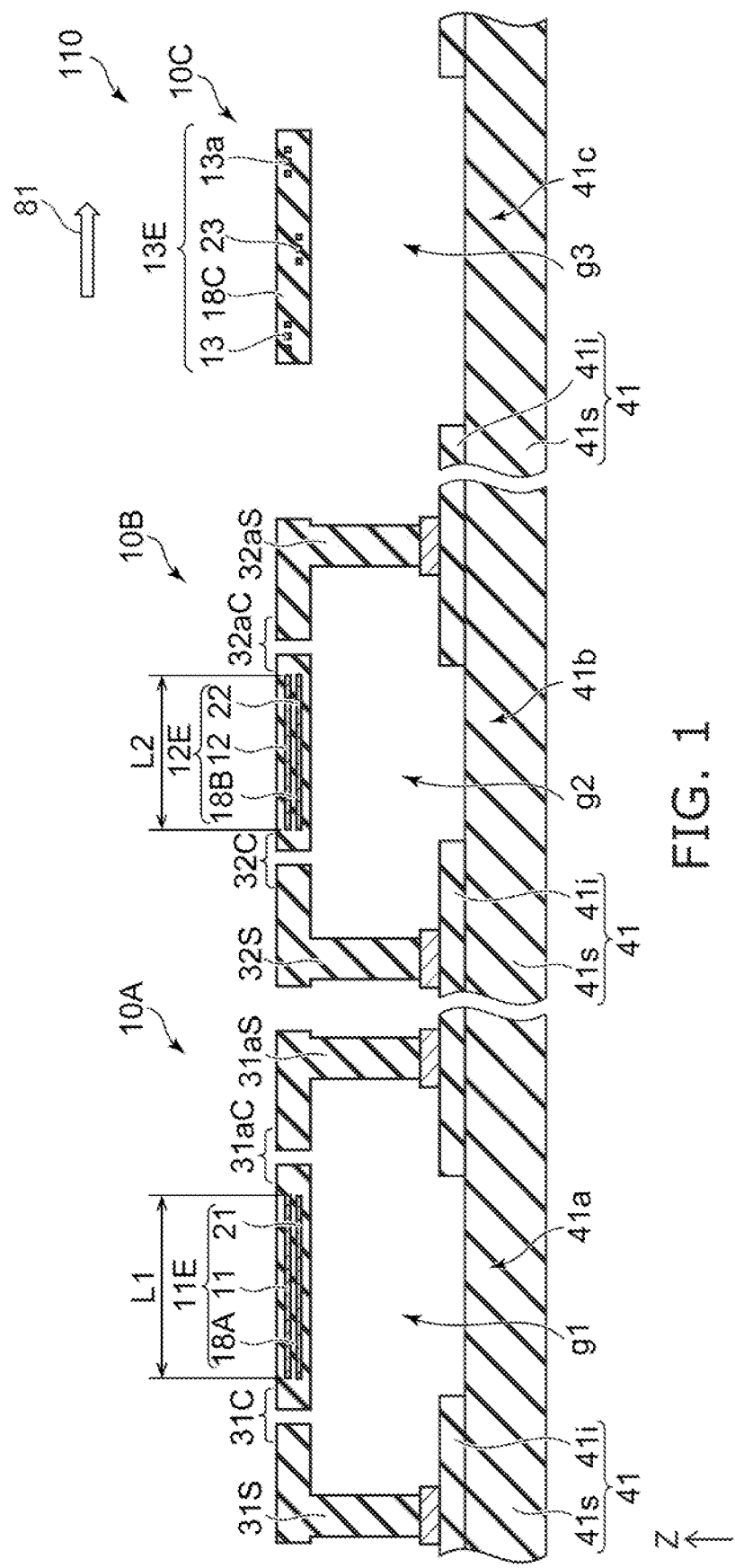
FIG. 1 is a schematic cross-sectional view illustrating a sensor according to a first embodiment.

According to one embodiment, a sensor includes a base, a first detection part, a second detection part, and a third detection part. The base includes a first base region, a second base region, and a third base region. The first detection part includes a first support part, a first connection part, and a first detection element. The first support part is fixed to the base. The first connection part is supported by the first support part. The first connection part supports the first detection element. A first gap is provided between the first base region and the first detection element. The first detection part has a first area of the first detection element, a first connection part length of the first connection part, a first connection part width of the first connection part, a first connection part thickness of the first connection part, a first connection part material of the first connection part, and a first distance. The first distance is a distance between the first base region and the first detection element. The second detection part includes a second support part, a second connection part, and a second detection element. The second support part is fixed to the base. The second connection part is supported by the second support part. The second connection part supports the second detection element. A second gap is provided between the second base region and the second detection element. The second detection part includes at least one of a second area different from the first area of the second detection element, a second connection part length different from the first connection part length of the second connection part, a second connection part width different from the first connection part width of the second connection part, a second connection part thickness different from the first connection part thickness of the second connection part, a second connection part material different from the first connection part material of the second connection part, or a second distance different from the first distance. The second distance is a distance between the second base region and the second detection element. The third detection part includes a third detection element. The third detection element includes a third resistance member, a third other resistance member, and a third conductive member. The third conductive member is between the third resistance member and the third other resistance member. A third gap is provided between the third base region and the third detection element.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a sensor according to a first embodiment.

As shown in FIG. 1, a sensor 110 according to the embodiment includes a base 41, a first detection part 10A, a second detection part 10B, and a third detection part 10C.

As shown in FIG. 1, the base 41 includes a first base region 41a, a second base region 41b and a third base region 41c. In this example, the base 41 includes a substrate 41s and an insulating film 41i. The substrate 41s may be, for example, a semiconductor substrate (for example, a silicon substrate). In one example, the base 41 may include a semiconductor. The substrate 41s may include, for example, a semiconductor circuit or the like. The substrate 41s may include a connection member such as a via electrode.

For example, a direction from the first base region 41a to the second base region 41b is along an upper surface of the base 41, for example. A direction from the first base region 41a to the third base region 41c is along the upper surface of the base 41, for example. In this example, the first base region 41a, the second base region 41b and the third base region 41c are continuous with each other. As will be discussed below, these base regions may be spaced apart from each other.

The first detection part 10A includes a first support part 31S, a first connection part 31C, and a first detection element 11E. The first support part 31S is fixed to the base 41. The first support part 31S may be fixed to the base 41 via other member. The first connection part 31C is supported by the first support part 31S. The first connection part 31C supports the first detection element 11E. A first gap g1 is provided between the first base region 41a and the first detection element 11E. The first gap g1 is further provided between the first connection part 31C and the first base region 41a.

For example, the first detection element 11E includes a first resistance member 11, a first conductive member 21 and a first insulating member 18A. At least a part of the first insulating member 18A is between the first resistance member 11 and the first conductive member 21.

As shown in FIG. 1, the second detection part 10B includes a second support part 32S, a second connection part 32C and a second detection element 12E. The second support part 32S is fixed to the base 41. The second support part 32S may be fixed to the base 41 via other member. The second connection part 32C is supported by the second support part 32S. The second connection part 32C supports the second detection element 12E. A second gap g2 is provided between the second base region 41b and the second detection element 12E. The second gap g2 is further provided between the second connection part 32C and the second base region 41b.

The second detection element 12E includes a second resistance member 12, a second conductive member 22 and a second insulating member 18B. At least a part of the second insulating member 18B is between the second resistance member 12 and the second conductive member 22.

As shown in FIG. 1, the third detection part 10C includes a third detection element 13E. The third detection element 13E includes a third resistance member 13, a third other resistance member 13a and a third conductive member 23. The third conductive member 23 is between the third resistance member 13 and the third other resistance member 13a. A third gap g3 is provided between the third base region 41c and the third detection element 13E.

As shown in FIG. 1, the third detection element 13E may further include a third insulating member 18C. At least a part of the third insulating member 18C is between the third resistance member 13 and the third conductive member 23 and between the third other resistance member 13a and the third conductive member 23.

As will be described later, the third detection element 13E is supported by a third support part 33S and a third connection part 33C (see FIGS. 9A and 9B).

For example, a first current is supplied to the first conductive member 21 from a controller, which will be described later. This increases a temperature of the first detection element 11E. A detection target gas 81 is introduced into the space around the first detection element 11E. The temperature of the first detection element 11E changes (for example, decreases) due to heat conduction by the detection target gas 81. A change in the temperature mainly depends on the type and concentration of the detection target substance included in the detection target gas 81. The change in the temperature also depends on the flow rate of the detection target gas 81. The change in the temperature is detected as a change in electrical resistance of the first resistance member 11. The first detection part 10A functions at least as a first concentration sensor.

For example, a second current is supplied to the second conductive member 22 from the controller, which will be described later. This increases a temperature of the second detection element 12E. The detection target gas 81 is introduced into the space around the second detection element 12E. The temperature of the second detection element 12E changes (for example, decreases) due to heat conduction by the detection target gas 81. A change in the temperature mainly depends on the type and concentration of the detection target substance included in the detection target gas 81. The change in the temperature also depends on the flow rate of the detection target gas 81. The change in the temperature is detected as a change in electrical resistance of the first resistance member 11. The second detection part 10B functions at least as a second concentration sensor.

As will be described later, the first detection element 11E and the second detection element 12E have different thermal characteristics. Thermal characteristics include, for example, heat dissipation. Thermal characteristics include, for example, thermal resistance. As a result, different characteristics are obtained with respect to the detection target gas 81 in the multiple detection elements. For example, it becomes possible to detect the concentrations of multiple types of detection target substances included in the detection target gas 81.

On the other hand, a third current is supplied to the third conductive member 23 from the controller, which will be described later. As a result, the temperature of the third resistance member 13 and the third other resistance member 13a included in the third detection element 13E increases. For example, the detection target gas 81 flows from the third resistance member 13 to the third other resistance member 13a. Due to the flow of the detection target gas 81, a difference occurs between the temperature of the third resistance member 13 and the temperature of the third other resistance member 13a. By detecting the electrical resistance of these resistance members, the temperature difference in these resistance members can be detected. The temperature difference mainly depends on the flow rate of the detection target gas 81. The temperature difference also depends on the type and concentration of the detection target substance in the detection target gas 81. The third detection part 10C functions at least as a flow sensor.

As described above, the detection characteristics of the first detection part 10A (first concentration sensor) depend on the flow rate as well as the concentration. Detection by the second detection part 10B (second concentration sensor) depends on the flow rate in addition to the concentration. Detection by the third detection part 10C (flow rate sensor) depends on the type and concentration of the detection target substance in addition to the flow rate. These detectors are combined. As a result, the type of detection target substance, the concentration of the detection target substance, and the flow rate can be accurately detected.

According to the embodiment, it is possible to provide a sensor whose characteristics can be improved. For example, the concentration and flow rate of each of multiple substances of different types can be detected with high accuracy.

The number of concentration sensors may be any integer of 2 or more. On the other hand, at least one flow sensor should be provided. For example, "first detection part" to "nth detection part" are provided. "n" is any integer of 3 or greater. The "nth detection part" is the flow rate sensor (the third detection part 10C in the above example). The "first detection part" to the "(n-1)th detection part" are assumed to be multiple sensors. In this case, the detection values Vout1 to Voutn of the "first detection part" to "nth detection part" are expressed by the following first formula.

$$\begin{aligned} V_{out1} &= f_1(C_1, C_2, C_3, \ldots, C_n, \text{Flow}) \\ V_{out2} &= f_2(C_1, C_2, C_3, \ldots, C_n, \text{Flow}) \\ V_{out3} &= f_3(C_1, C_2, C_3, \ldots, C_n, \text{Flow}) \\ &\vdots \\ V_{out(n-1)} &= f_{n-1}(C_1, C_2, C_3, \ldots, C_n, \text{Flow}) \\ V_{outn} &= f_n(C_1, C_2, C_3, \ldots, C_n, \text{Flow}) \end{aligned} \quad (1)$$

In the first formula, "$f_1$" to "$f_n$" are functions. "$C_1$" to "$C_n$" are concentrations. "Flow" is the flow rate. By solving the simultaneous equations of the first formula, the concentration and flow rate are obtained as the second formula.

$$C = (C_1, C_2, C_3, \ldots, C_n, \text{Flow}) \quad (2)$$

Calculation of the first formula is performed by a controller, which will be described later. As a result, the concentration and flow rate of the target substance in the detection target gas 81 are obtained.

As described above, thermal characteristics are different between the first detection part 10A and the second detection part 10B. Differences in thermal characteristics are obtained, for example, by several configurations (and combinations) thereof as follows.

For example, the area of the second detection element 12E is different from the area of the first detection element 11E. For example, the length of the second connection part 32C is different from the length of the first connection part 31C. For example, a width of the second connection part 32C is different from a width of the first connection part 31C. For example, a thickness of the second connection part 32C is different from a thickness of the first connection part 31C. For example, the material of the second connection part 32C is different from the material of the first connection part 31C. For example, the distance between the second base region 41b and the second detection element 12E is different than the distance between the first base region 41a and the first detection element 11E. Due to at least one of these differences, detection characteristics different from each other are obtained in the multiple detection parts. Examples of such configuration differences will be described later.

As shown in FIG. 1, for example, the first detection part 10A may further include a first other support part 31aS and a first other connection part 31aC. The first other support part 31aS is fixed to the base 41. The first other connection part 31aC is supported by the first other support part 31aS. The first other connection part 31aC supports the first detection element 11E. The first gap g1 is provided between the first base region 41a and the first other connection part 31aC. In this example, the first detection element 11E is provided between the first connection part 31C and the first other connection part 31aC. The first detection part 10A may have a double-supported beam structure. The configuration of the first other support part 31aS may be the same as the configuration of the first support part 31S. The configuration of the first other connection part 31aC may be the same as the configuration of the first connection part 31C.

As shown in FIG. 1, for example, the second detection part 10B may further include a second other support part 32aS and a second other connection part 32aC. The second other support part 32aS is fixed to the base 41. The second other connection part 32aC is supported by the second other support part 32aS. The second other connection part 32aC supports the second detection element 12E. The second gap g2 is provided between the second base region 41b and the second other connection part 32aC. In this example, the second detection element 12E is provided between the second connection part 32C and the second other connection part 32aC. The second detection part 10B may have a double-supported beam structure. The configuration of the second other support part 32aS may be the same as the configuration of the second support part 32S. The configuration of the second other connection part 32aC may be the same as the configuration of the second connection part 32C.

An example of the configuration of the third detection part 10C will be described later.

As shown in FIG. 1, a first direction from the first base region 41a to the first detection element 11E is defined as a Z-axis direction. A direction from the second base region 41b to the second detection element 12E is along the first direction (Z-axis direction). A direction from the third base region 41c to the third detection element 13E is along the first direction (Z-axis direction).

Figure 2:
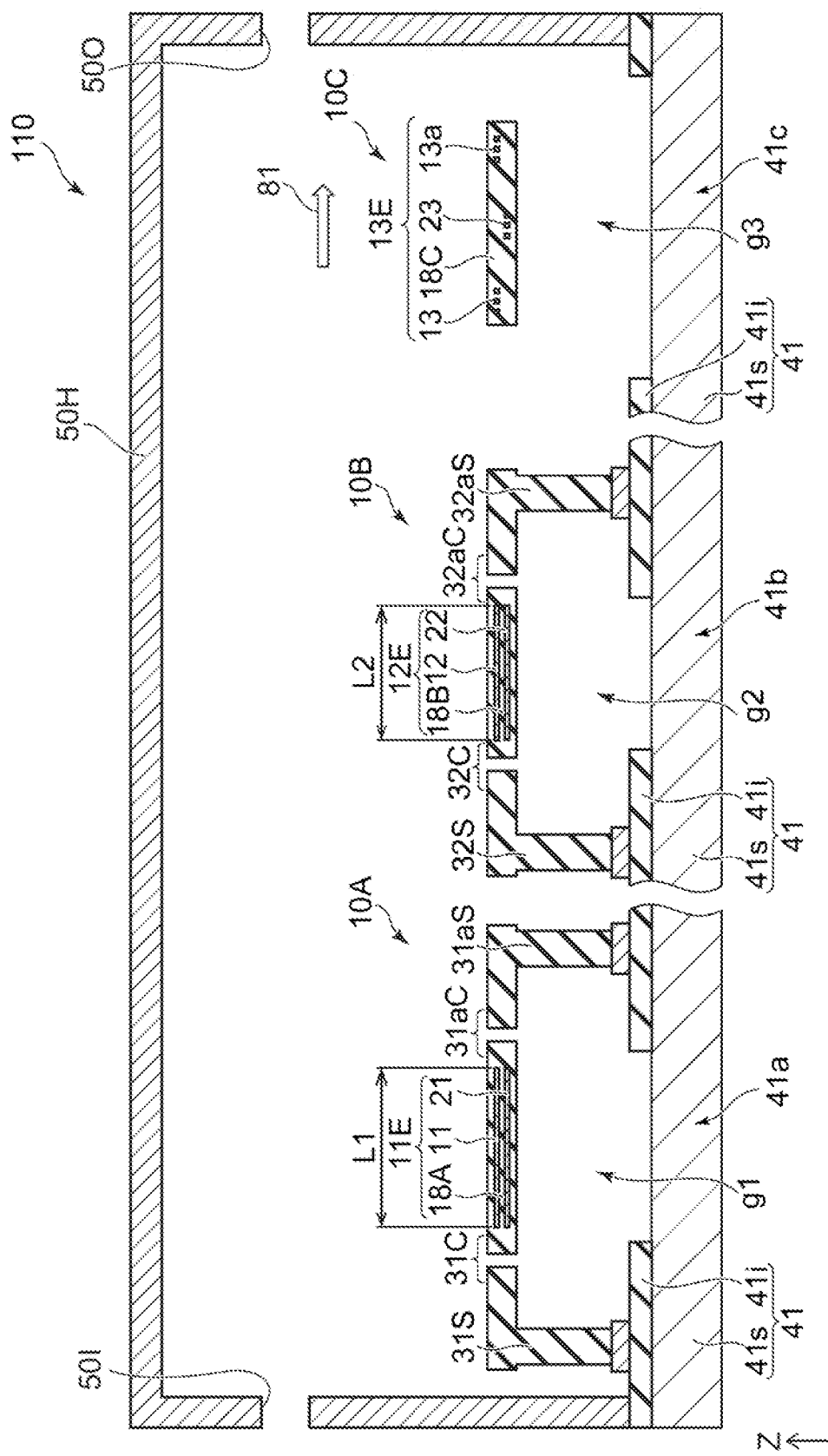
FIG. 2 is a schematic cross-sectional view illustrating the sensor according to the first embodiment.

FIG. 2 is a schematic cross-sectional view illustrating the sensor according to the first embodiment.

As shown in FIG. 2, the sensor 110 may include a housing 50H. The housing 50H includes an inflow port 50I and an outflow port 50O. The first detection element 11E, the second detection element 12E, and the third detection element 13E are provided between the base 41 and at least a part of the housing 50H. As shown in FIG. 2, a direction from the third resistance member 13 to the third other resistance member 13a follows the flow direction of the detection target gas 81 flowing from the inflow port 50I to the outflow port 50O.

Figure 3:
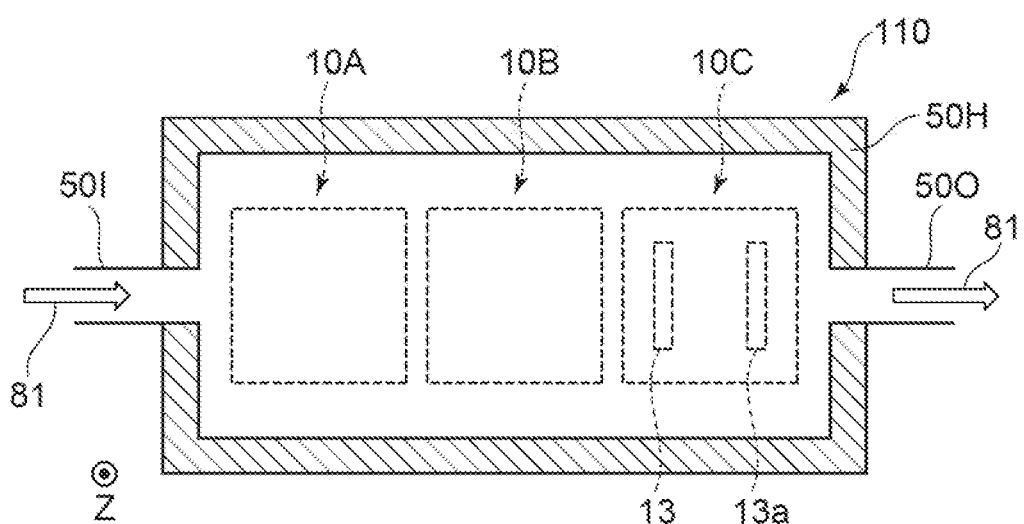
FIG. 3 is a schematic plan view illustrating the sensor according to the first embodiment.

FIG. 3 is a schematic plan view illustrating the sensor according to the first embodiment.

FIG. 3 is a plan view on an X-Y plane perpendicular to the first direction (Z-axis direction). In FIG. 3, a part of the housing 50H is omitted. As shown in FIG. 3, also in this example, the direction from the third resistance member 13 to the third other resistance member 13a follows the flow direction of the detection target gas 81 flowing from the inflow port 50I to the outflow port 50O. In this example, the direction from the third resistance member 13 to the third other resistance member 13a follows the direction from the first detection part 10A to the second detection part 10B. In this example, the second detection part 10B is between the first detection part 10A and the third detection part 10C on the plane perpendicular to the Z-axis direction. Various modifications are possible for the mutual positional relationship among the first detection part 10A, the second detection part 10B, and the third detection part 10C.

Figure 4:
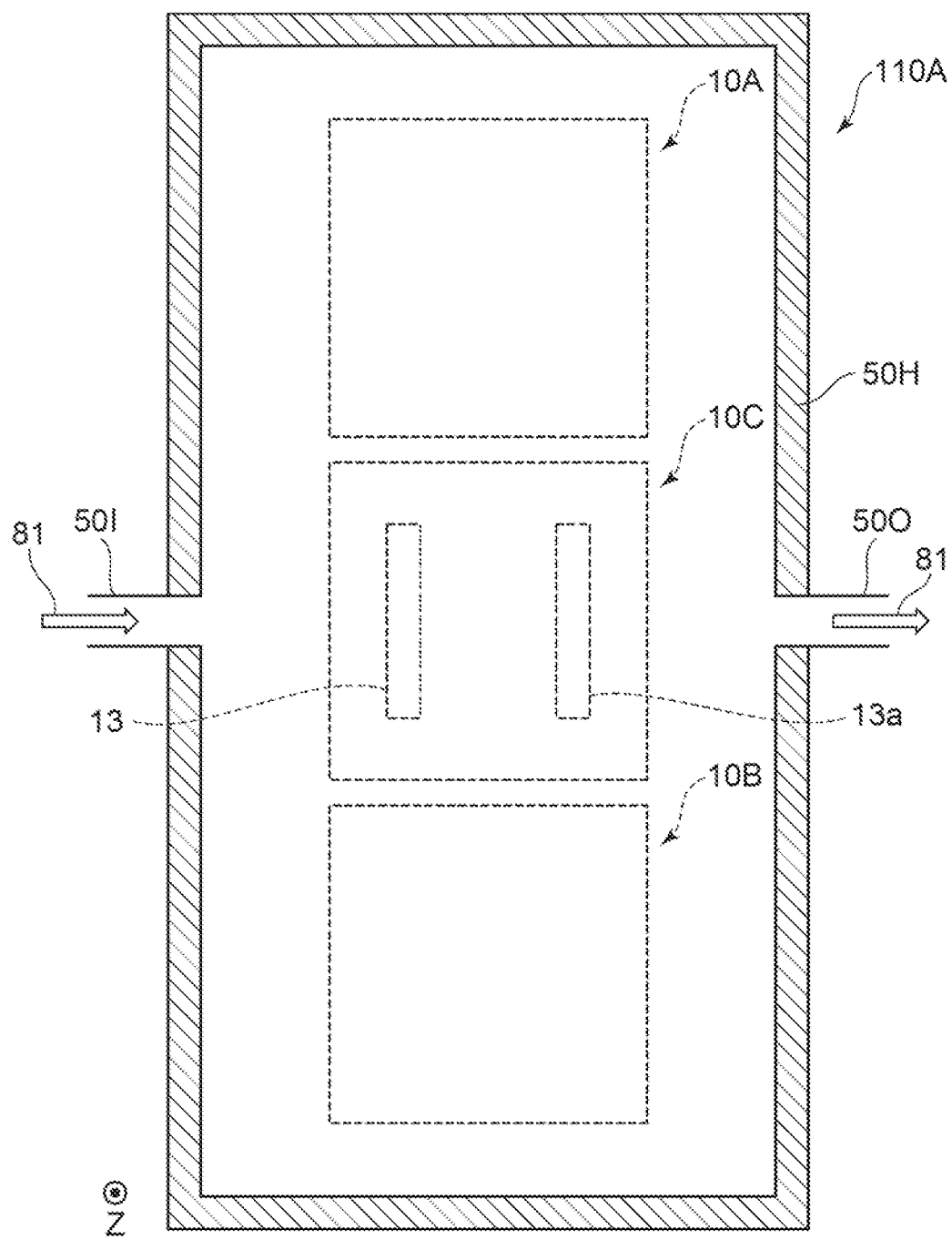
FIG. 4 is a schematic plan view illustrating a sensor according to the first embodiment.

FIG. 4 is a schematic plan view illustrating a sensor according to the first embodiment.

As shown in FIG. 4, a sensor 110A according to the embodiment is also provided with the first detection part 10A, the second detection part 10B, and the third detection part 10C. In the sensor 110A, the direction from the third resistance member 13 to the third other resistance member 13a crosses the direction from the first detection part 10A to the second detection part 10B. Other configurations of the sensor 110A may be the same as those of the sensor 110. In the sensor 110A as well, the direction from the third resistance member 13 to the third other resistance member 13a follows the flow direction of the detection target gas 81 flowing from the inflow port 50I to the outflow port 50O.

Figure 5:
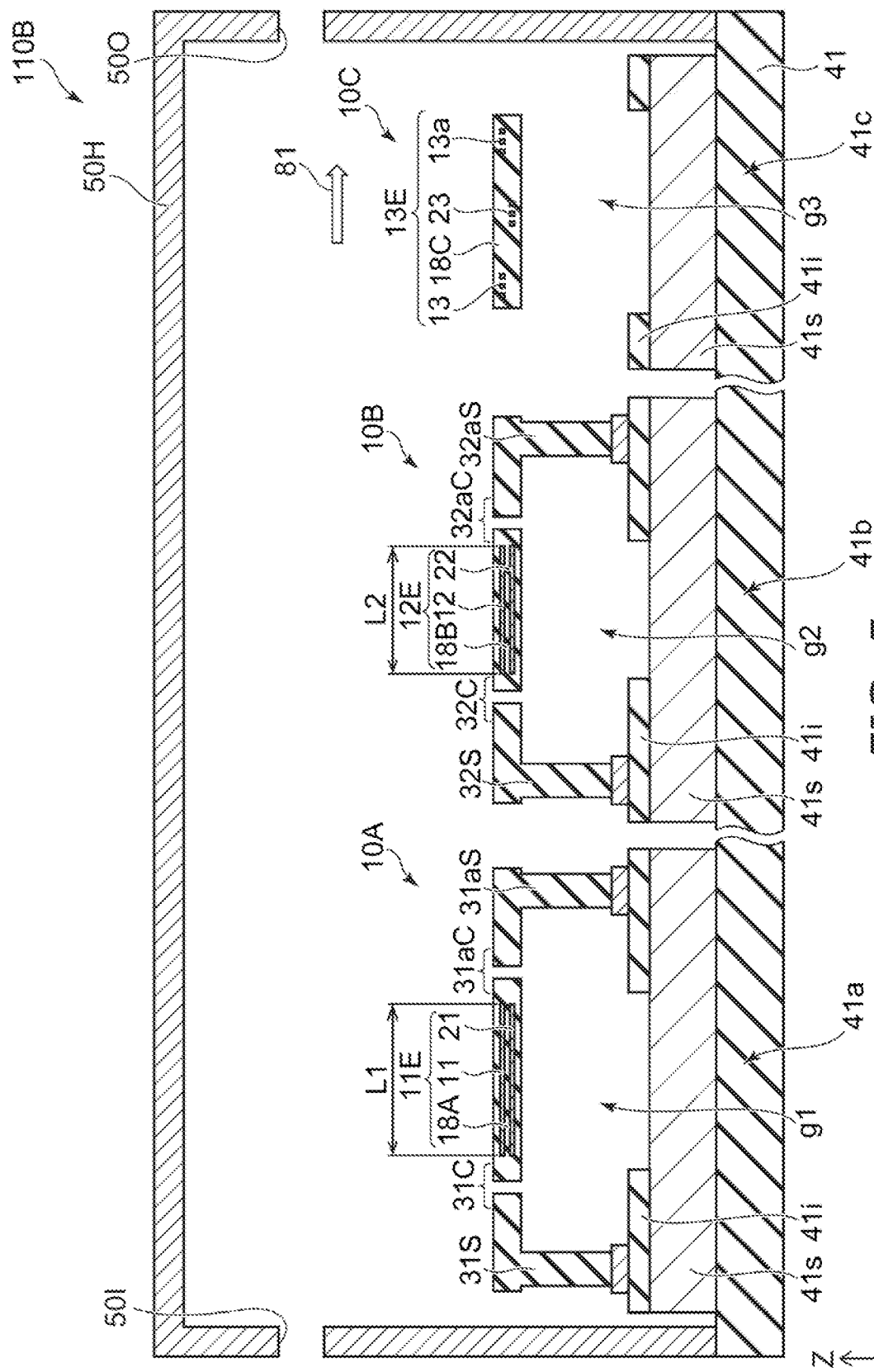
FIG. 5 is a schematic plan view illustrating a sensor according to the first embodiment.

FIG. 5 is a schematic plan view illustrating a sensor according to the first embodiment.

As shown in FIG. 5, a sensor 110B according to the embodiment includes the base 41, the first detection part 10A, the second detection part 10B, the third detection part 10C and the housing 50H. In the sensor 110B, the base 41 is a structure separate from the substrate 41s. The substrate 41s on which the first detection part 10A is provided is provided in the first base region 41a. The substrate 41s on which the second detection part 10B is provided is provided in the second base region 41b. The substrate 41s on which the third detection part 10C is provided is provided in the third base region 41c. These substrates 41s are separated from each other. Except for this, the configuration of the sensor 110B may be the same as the sensor 110 or the sensor 110A.

In the sensor 110B, the base 41 may be regarded as a part of the housing 50H. The first detection part 10A is provided between the first base region 41a of the base 41 and a part of the housing 50H. The second detection part 10B is provided between the second base region 41b of the base 41 and a part of the housing 50H. The third detection part 10C is provided between the third base region 41c of the base 41 and a part of the housing 50H.

Figure 6:
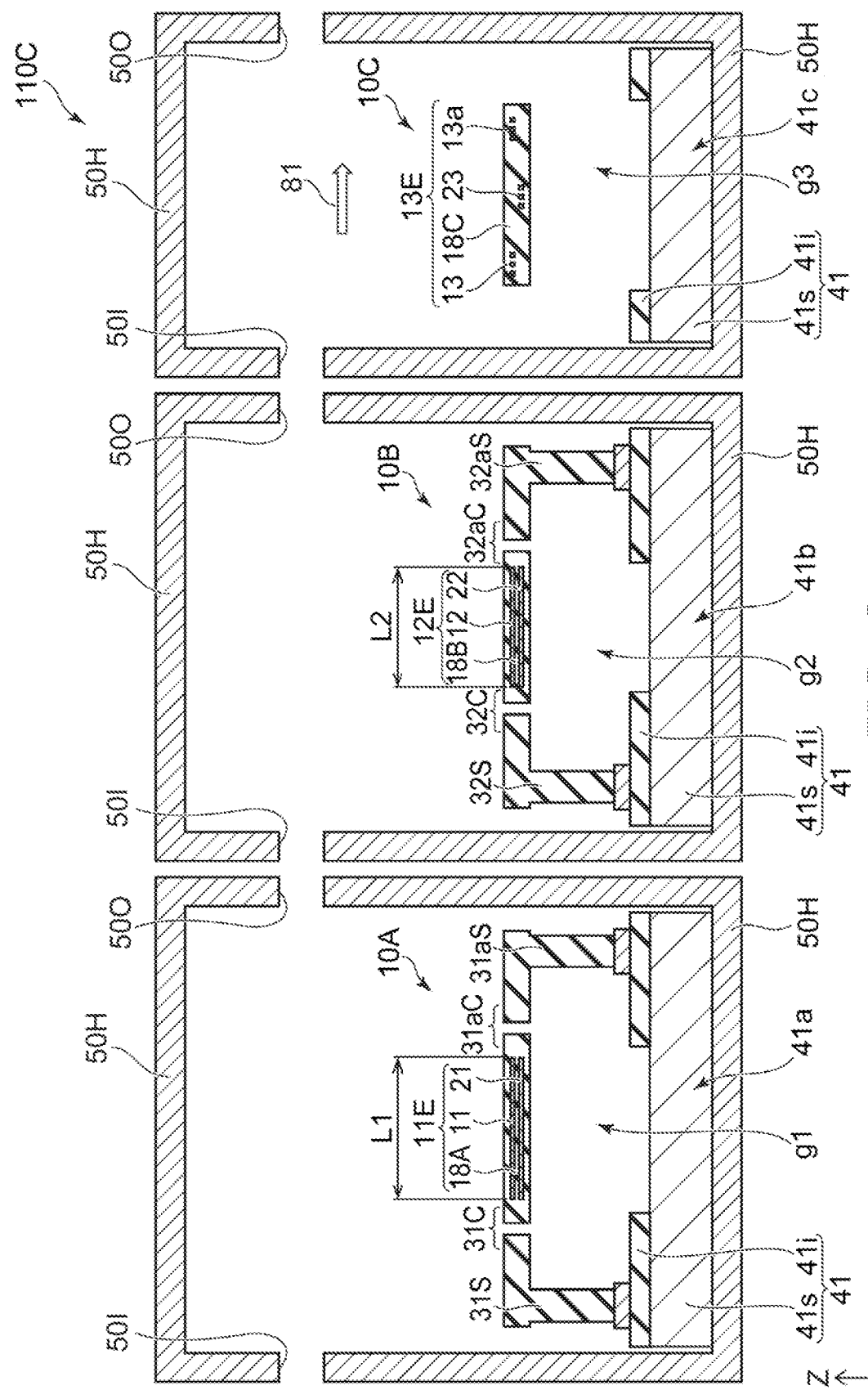
FIG. 6 is a schematic cross-sectional view illustrating a sensor according to the first embodiment.

FIG. 6 is a schematic cross-sectional view illustrating a sensor according to the first embodiment.

As shown in FIG. 6, a sensor 110C according to the embodiment includes the base 41, the first detection part 10A, the second detection part 10B, the third detection part 10C and the housing 50H. In sensor 110C, the first base region 41a, the second base region 41b and the third base region 41c are separated from each other. Except for this, the configuration of the sensor 110C may be the same as the sensor 110 or the sensor 110A.

Thus, in the embodiment, at least two of the first base region 41a, the second base region 41b, and the third base region 41c may be discontinuous.

In this example, multiple housings 50H are provided. A first detection module including the first detection part 10A may be provided between the first base region 41a and a part of one of the multiple housings 50H. A second detection module including the second detection part 10B may be provided between the second base region 41b and another part of the multiple housings 50H. The second detection module including the third detection part 10C may be provided between the third base region 41c and another part of the multiple housings 50H.

Each of the first base region 41a, the second base region 41b, and the third base region 41c may be a part of the housing 50H.

Examples of configurations of the first detection part 10A, the second detection part 10B, and the third detection part 10C will be further described below.

Figure 7A:
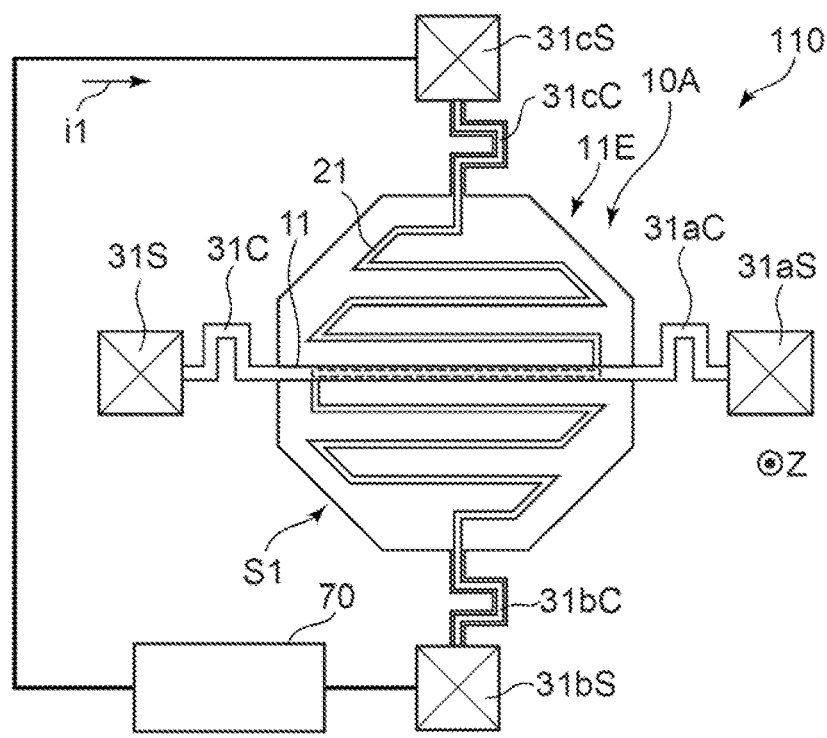
FIGS. 7A and 7B are schematic plan views illustrating a part of the sensor according to the first embodiment.
Figure 7B:
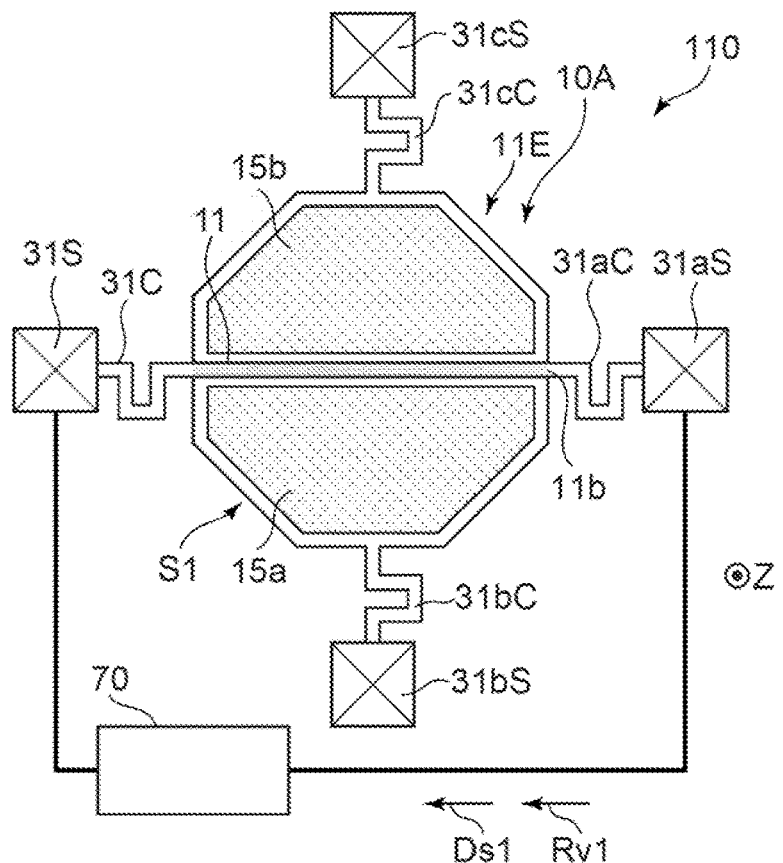

FIGS. 7A and 7B are schematic plan views illustrating a part of the sensor according to the first embodiment.

These figures illustrate the first detection part 10A. FIG. 7A illustrates a plane pattern of the first conductive member 21. FIG. 7B illustrates a plane pattern of the first resistance member 11.

As shown in FIGS. 7A and 7B, in this example, the first detection element 11E (the portion including the first resistance member 11, the first conductive member 21 and the first insulating member 18A) is octagonal. The planar shape of the first detection element 11E is arbitrary. The first detection element 11E has a first area S1. The first area S1 is the area of the first detection element 11E on the plane crossing the first direction (Z-axis direction) from the first base region 41a to the first detection element 11E.

As shown in FIGS. 7A and 7B, a controller 70 may be provided. The controller 70 can be electrically connected to the first resistance member 11 and the first conductive member 21. For example, the controller 70 supplies a first current i1 to the first conductive member 21 to raise the temperature of the first detection element 11E.

The first detection part 10A may further include a support part 31bS and a connection part 31bC. The support part 31bS is fixed to the base 41. The connection part 31bC is supported by the support part 31bS. The connection part 31bC supports the first detection element 11E.

The first detection part 10A may further include a support part 31cS and a connection part 31cC. The support part 31cS is fixed to the base 41. The connection part 31cC is supported by the support part 31cS. The connection part 31cC supports the first detection element 11E. The first detection element 11E is provided between the connection part 31bC and the connection part 31cC.

The first current i1 may be supplied to the first conductive member 21 via the support part 31bS, the connection part 31bC, the support part 31cS and the connection part 31cC.

As shown in FIG. 7B, the controller 70, for example, the may be electrically connected to the first resistance member 11 via the first support part 31S, the first connection part 31C, the first other support part 31a5, and the first other connection part 31aC.

As shown in FIG. 7B, the first detection element 11E may include a first layer 15a and a second layer 15b. The first layer 15a and the second layer 15b may include the same material and thickness as the first resistance member 11. The first resistance member 11 is provided between the first layer 15a and the second layer 15b. By providing these layers, deformation (for example, warpage) of the first detection element 11E is suppressed.

Figure 8A:
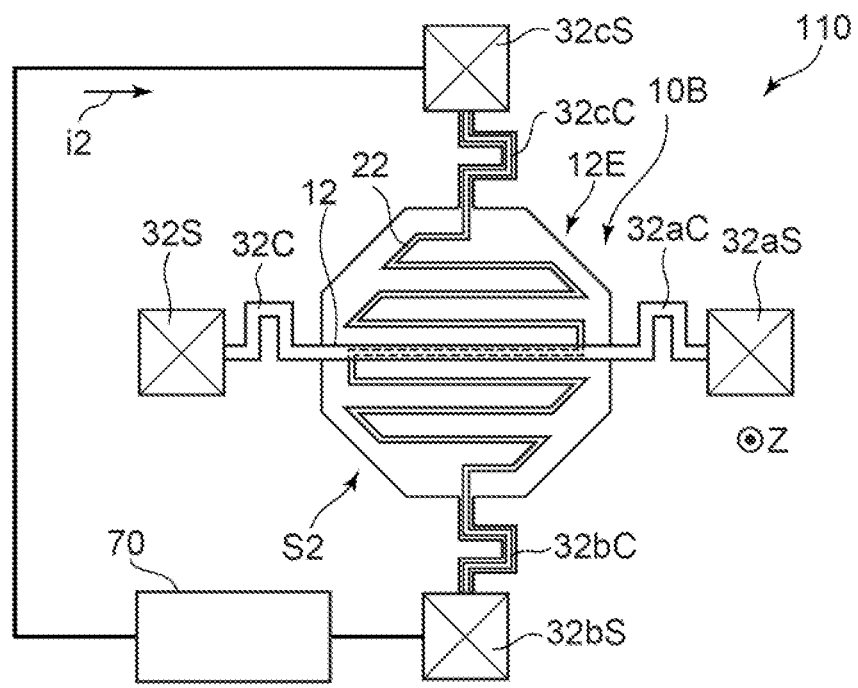
FIGS. 8A and 8B are schematic plan views illustrating a part of the sensor according to the first embodiment.
Figure 8B:
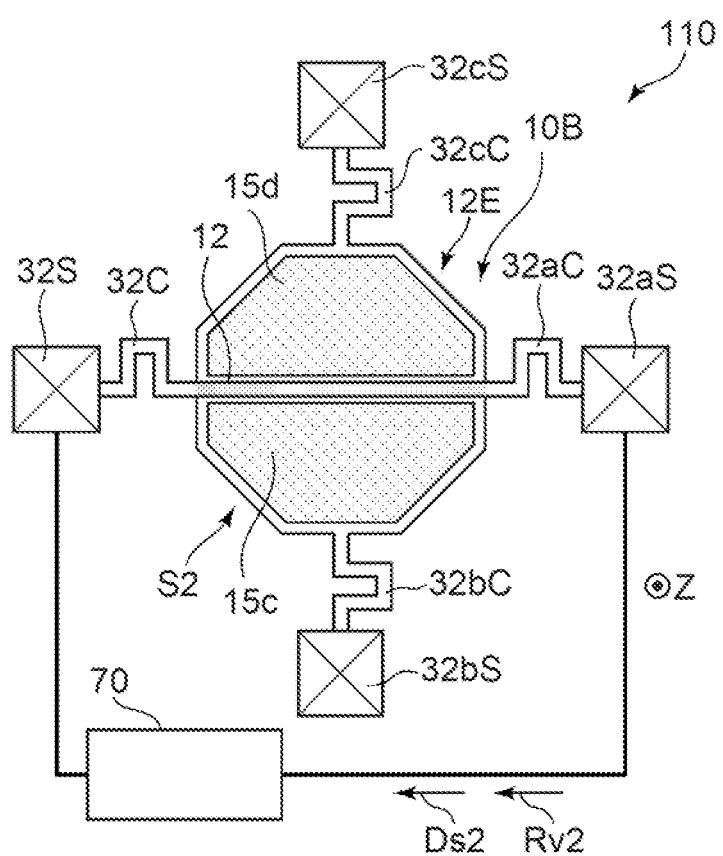

FIGS. 8A and 8B are schematic plan views illustrating a part of the sensor according to the first embodiment.

These figures illustrate the second detection part 10B. FIG. 8A illustrates a plane pattern of the second conductive member 22. FIG. FIG. 8B illustrates a plane pattern of the second resistance member 12.

As shown in FIGS. 8A and 8B, in this example, the second detection element 12E (the part including the second resistance member 12, the second conductive member 22 and the second insulating member 18B) is octagonal. The planar shape of the second detection element 12E is arbitrary. The second detection element 12E has a second area S2. The second area S2 is the area of the second detection element 12E on the plane crossing the first direction (Z-axis direction). In this example, the second area S2 is different from the first area S1. In this example, the second area S2 is smaller than the first area S1.

As shown in FIGS. 8A and 8B, the controller 70 can be electrically connected to the second resistance member 12 and the second conductive member 22. For example, the controller 70 supplies a second current i2 to the second conductive member 22 to raise the temperature of the second detection element 12E.

The second detection part 10B may further include a support part 32bS and a connection part 32bC. The support part 32bS is fixed to the base 41. The connection part 32bC is supported by the support part 32bS. The connection part 32bC supports the second detection element 12E.

The second detection part 10B may further include a support part 32cS and a connection part 32cC. The support part 32cS is fixed to the base 41. The connection part 32cC is supported by the support part 32cS. The connection part 32cC supports the second detection element 12E. The second detection element 12E is provided between the connection part 32bC and the connection part 32cC.

The second current i2 may be supplied to the second conductive member 22 via the support part 32bS, the connection part 32bC, the support part 32cS and the connection part 32cC.

As shown in FIG. 8B, the controller 70, for example, may be electrically connected to the second resistance member 12 via the second support part 32S, the second connection part 32C, the second other support part 32aS, and the second other connection part 32aC.

As shown in FIG. 8B, the second detection element 12E may include a third layer 15c and a fourth layer 15d. The third layer 15c and the fourth layer 15d may include the same material and thickness as the second resistance member 12. The second resistance member 12 is provided between the third layer 15c and the fourth layer 15d. Deformation (for example, warpage) of the second detection element 12E is suppressed by providing these layers.

As shown in FIG. 1, the first detection element 11E has a first length L1 in a direction (e.g., second direction) crossing the first direction (Z-axis direction). The second detection element 12E has a second length L2 in a direction (e.g., second direction) crossing the first direction (Z-axis direction). In this example, the second length L2 is shorter than the first length L1. A difference in area is obtained.

Figure 9A:
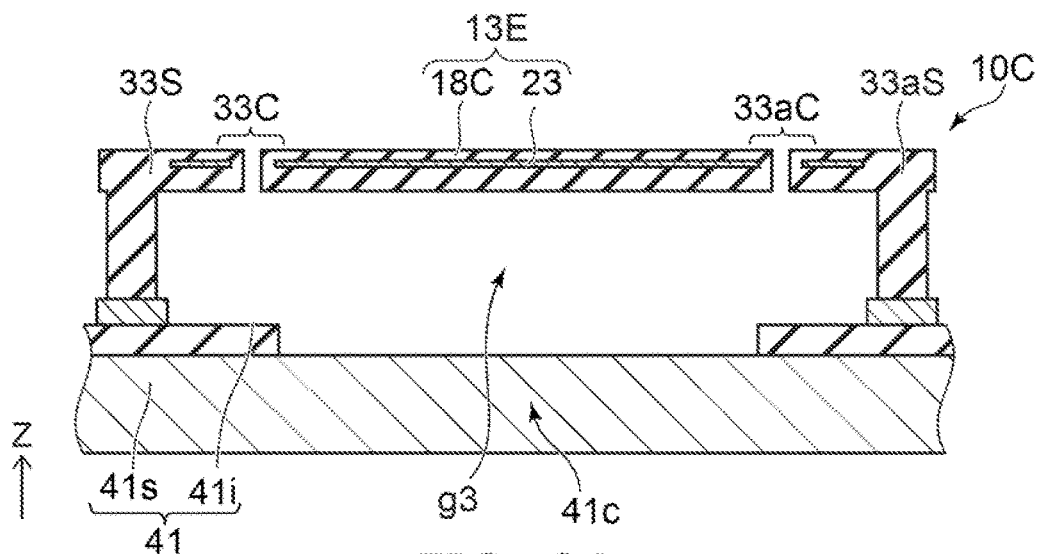
FIGS. 9A and 9B are schematic views illustrating a part of the sensor according to the first embodiment.
Figure 9B:
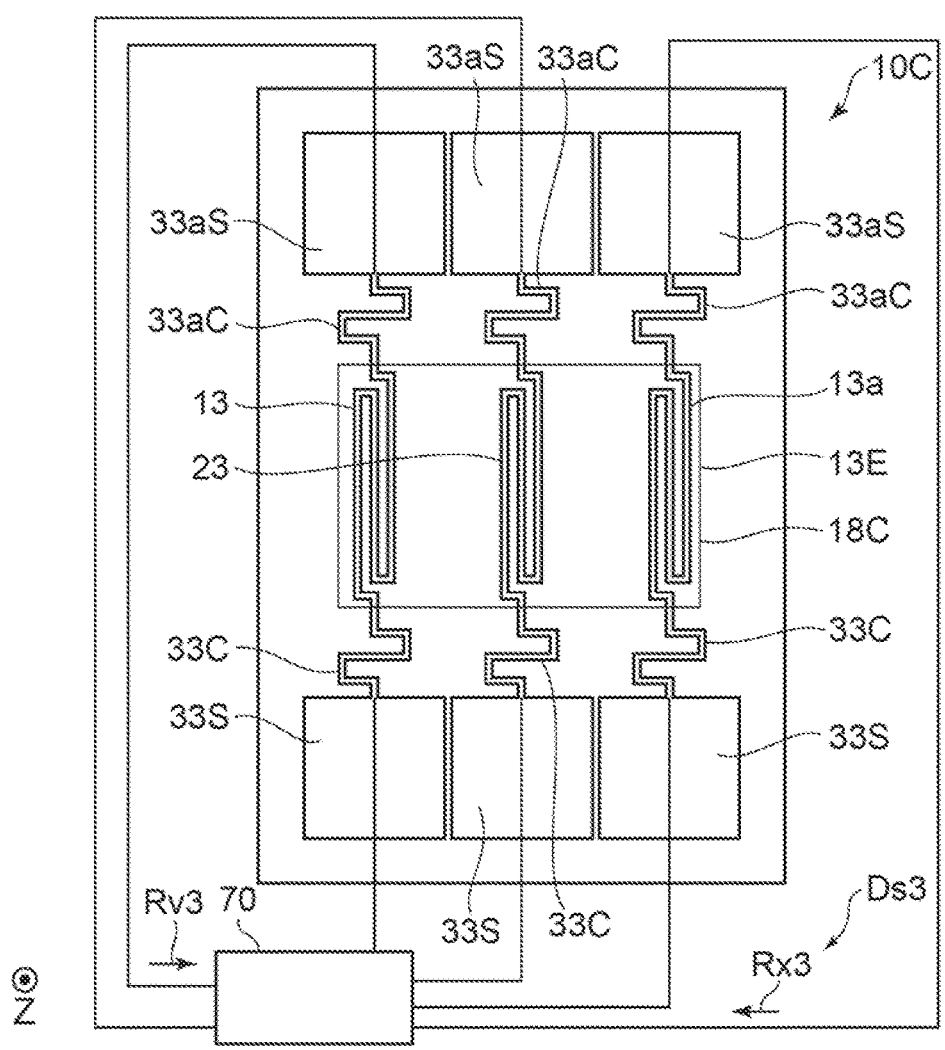

FIGS. 9A and 9B are schematic views illustrating a part of the sensor according to the first embodiment.

These figures illustrate the third detection part 10C. FIG. 9A is a cross-sectional view. FIG. 9B is a plan view.

As shown in FIG. 9A, for example, the third detection part 10C may include a third support part 33S and a third connection part 33C. The third support part 33S is fixed to the base 41. The third connection part 33C is supported by the third support part 33S. The third connection part 33C supports the third detection element 13E. The third gap g3 is provided between the third base region 41c and the third connection part 33C.

As shown in FIG. 9A, for example, the third detection part 10C may further include a third other support part 33aS and a third other connection part 33aC. The third other support part 33aS is fixed to the base 41. The third other connection part 33aC is supported by the third other support part 33aS. The third other connection part 33aC supports the third detection element 13E. The third gap g3 is provided between the third base region 41c and the third other connection part 33aC. In this example, the third detection element 13E is provided between the third connection part 33C and the third other connection part 33aC. The third detection part 10C may have a double-supported beam structure.

As shown in FIG. 9B, in this example, three sets of the third support part 33S and the third connection part 33C are provided. Three sets of the third other support part 33aS and the third other connection part 33aC are provided. The controller 70 is electrically connected to the third resistance member 13 via one third connection part 33C and one third other connection part 33aC. The controller 70 is electrically connected to the third other resistance member 13a via another one third connection part 33C and another one third other connection part 33aC. The controller 70 is electrically connected to the third conductive member 23 via another one third connection part 33C and another one third other connection part 33aC.

The controller 70 supplies a current to the third conductive member 23 to raise the temperature of the third detection element 13E. The controller 70 can detect the difference between the electrical resistance of the third resistance member 13 and the electrical resistance of the third other resistance member 13a. The flow rate of the detection target gas 81 is detected based on the detection result of the difference.

The sensor (for example, the sensor 110, etc.) according to the embodiment may include the controller 70 (see FIGS. 7A and 7B, etc.). The controller 70 can obtain first detection data Ds1 (see FIG. 7B) obtained from the first detection part 10A. The controller 70 can obtain second detection data Ds2 (see FIG. 8B) obtained from the second detection part 10B. The controller 70 can obtain third detection data Ds3 (see FIG. 9B) obtained from the third detection part 10C. The controller 70 can derive the concentration of the detection target gas 81 and the flow rate of the detection target gas 81 based on the first detection data Ds1, the second detection data Ds2, and the third detection data Ds3. The concentration of the detection target gas 81 includes the concentrations of each of the multiple types of detection target substances included in the detection target gas 81.

The multiple types of detection target substances may include, for example, at least two selected from the group consisting of carbon dioxide, carbon monoxide, hydrogen, oxygen and water. The multiple types of detection target substances are optional.

The first detection data Ds1 includes a first value Rv1 (see FIG. 7B) corresponding to the electrical resistance of the first resistance member 11. The second detection data Ds2 includes a second value Rv2 corresponding to the electrical resistance of the second resistance member 12 (see FIG. 8B). The third detection data Ds3 includes a third value Rv3 corresponding to the electrical resistance of the third resistance member 13 and a third other value Rx3 corresponding to the electrical resistance of the third other resistance member 13a (see FIG. 9B). The first value Rv1, the second value Rv2, the third value Rv3, and the third other value Rx3 change according to the concentration of the detection target gas 81 and the flow rate of the detection target gas 81.

The controller 70 can derive the concentration of the detection target gas 81 and the flow rate of the detection target gas 81 based on these values. In the derivation, the first and second formulas above are used.

An example in which the distance between the second base region 41b and the second detection element 12E is different from the distance between the first base region 41a and the first detection element 11E will be described below.

Figure 10A:
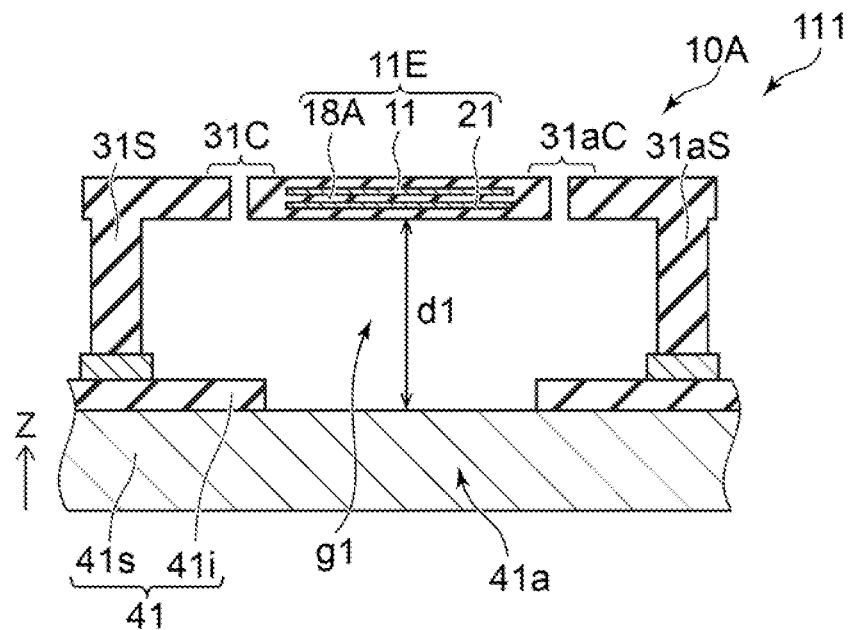
FIGS. 10A and 10B are schematic cross-sectional views illustrating a sensor according to the first embodiment.
Figure 10B:
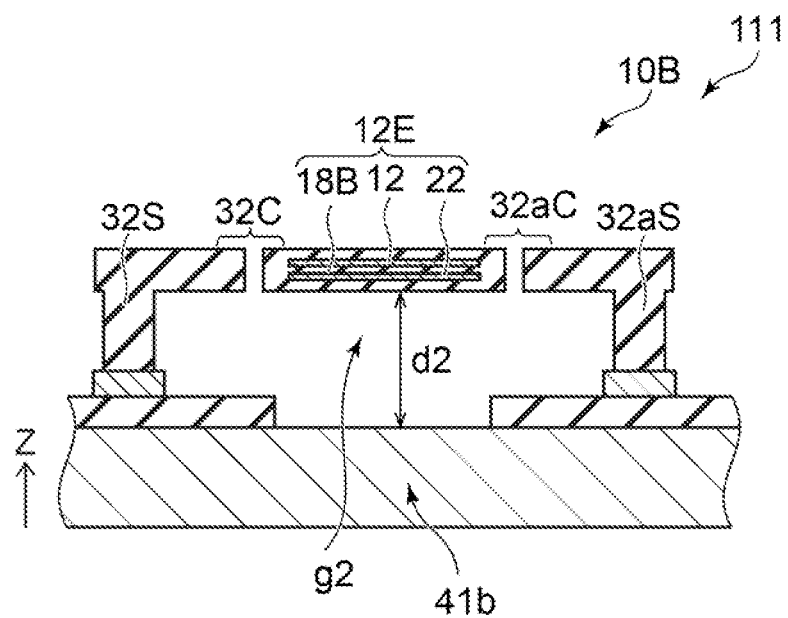

FIGS. 10A and 10B are schematic cross-sectional views illustrating a sensor according to the first embodiment.

FIG. 10A illustrates the first detection element 11E. FIG. 10B illustrates the second detection element 12E. As shown in FIGS. 10A and 10B, in a sensor 111 according to the embodiment, a height with respect to the base 41 is different between the first detection element 11E and the second detection element 12E. Except for this, the configuration of the sensor 111 may be the same as that of the sensor 110, for example.

In the sensor 111, a first distance d1 in the first direction (Z-axis direction) between the first base region 41a and the first detection element 11E is different a second distance d2 between the second base region 41b and the second detection element 12E. Since these distances are different from each other, heat dissipation characteristics from these detection elements via the base 41 are different. Different heat dissipation characteristics are obtained. Using the difference in the heat dissipation characteristics enables detection with higher accuracy.

Some examples of differences in the configuration of the connections are described below.

Figure 11A:
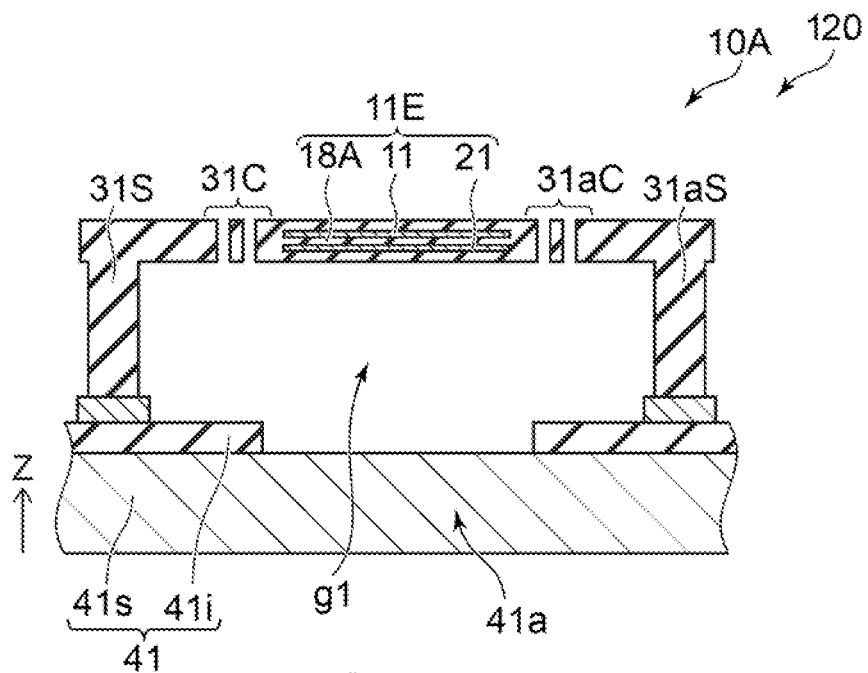
FIGS. 11A and 11B are schematic cross-sectional views illustrating a sensor according to the first embodiment.
Figure 11B:
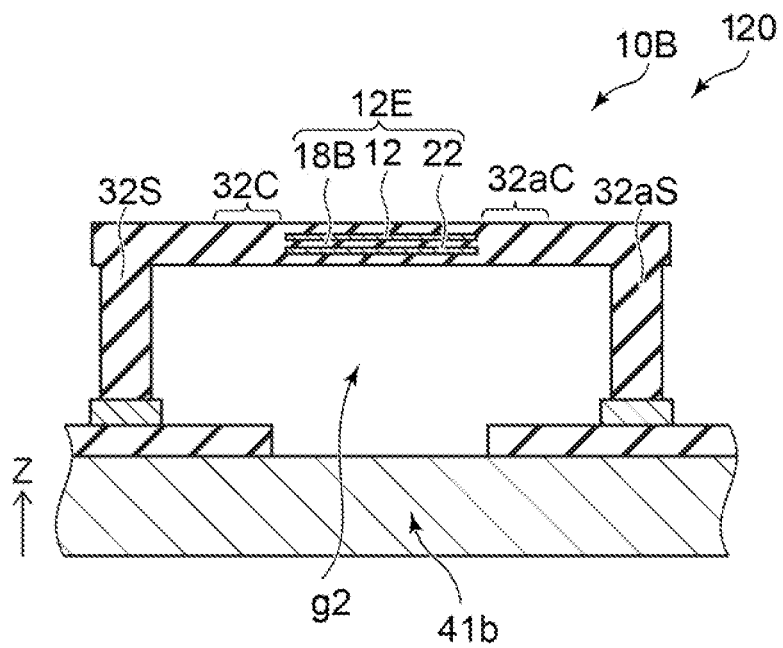

FIGS. 11A and 11B are schematic cross-sectional views illustrating a sensor according to the first embodiment.

Figure 12A:
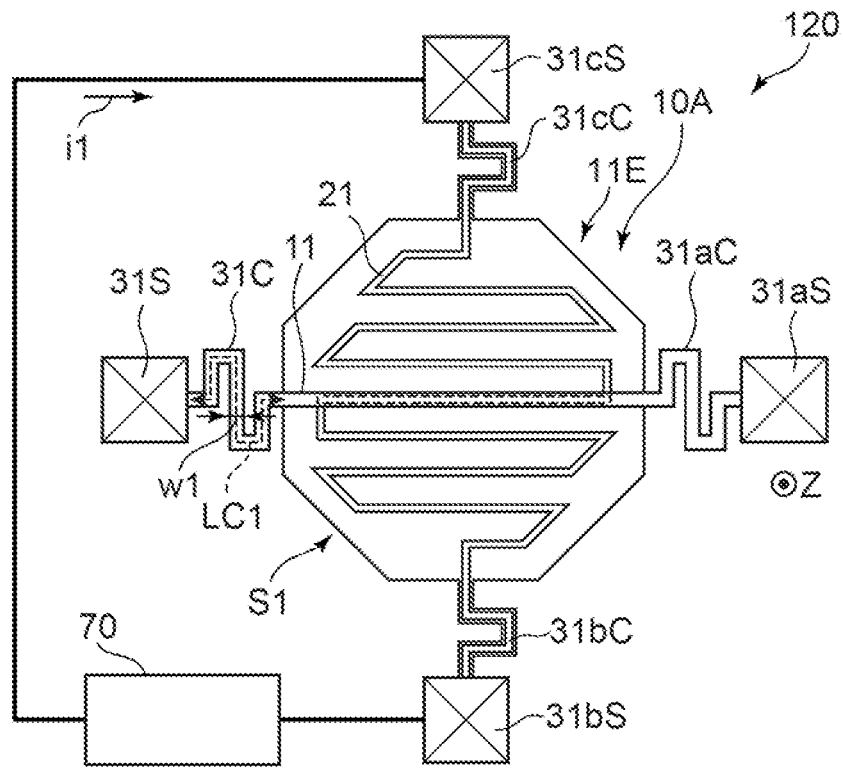
FIGS. 12A and 12B are schematic plan views illustrating the sensor according to the first embodiment.
Figure 12B:
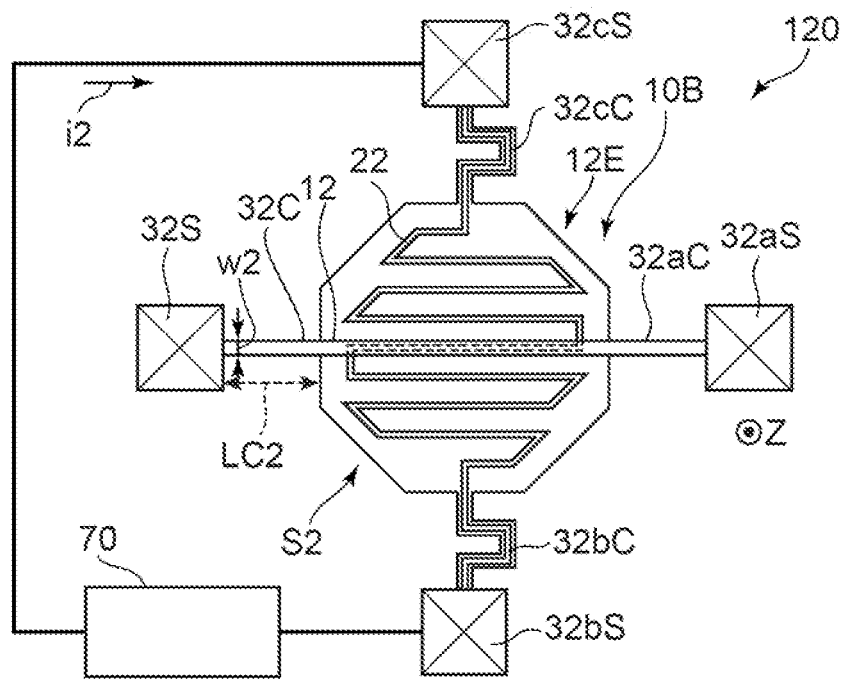

FIGS. 12A and 12B are schematic plan views illustrating the sensor according to the first embodiment.

FIGS. 11A and 12A illustrate the first detection element 11E. FIGS. 11B and 12B illustrate the second detection element 12E.

As shown in FIGS. 11A, 11B, 12A and 12B, in a sensor 120 according to the embodiment, a length of the first connection part 31C and a length of the second connection part 32C are differ from each other. Except for this, the configuration of the sensor 120 may be the same as that of the sensor 110, for example.

As shown in FIG. 12A, in this example, the first connection part 31C has a meander spring structure. On the other hand, as shown in FIG. 12B, the second connection part 32C is linear.

As shown in FIG. 12A, the first connection part 31C has a first connection part length LC1. The first connection part length LC1 is a length of the first connection part 31C along a path (first connection part path) between the first support part 31S and the first detection element 11E.

As shown in FIG. 12B, the second connection part 32C has a second connection part length LC2. The second connection part length LC2 is a length of the second connection part 32C along a path (second connection part path) between the second support part 32S and the second detection element 12E. The second connection part length LC2 is different from the first connection part length LC1.

As shown in FIG. 12A, the first connection part 31C has a first connection part width w1. The first connection part width w1 is a width of the first connection part 31C along the first connection part path between the first support part 31S and the first detection element 11E.

As shown in FIG. 12B, the second connection part 32C has a second connection part width w2. The second connection part width w2 is a width of the second connection part 32C in a direction crossing the second connection part path between the second support part 32S and the second detection element 12E. The second connection part width w2 may be different from the first connection part width w1. The difference in width provides a difference in the thermal resistance of the connection part. The difference in heat dissipation characteristics through the connection part can be used.

Figure 13A:
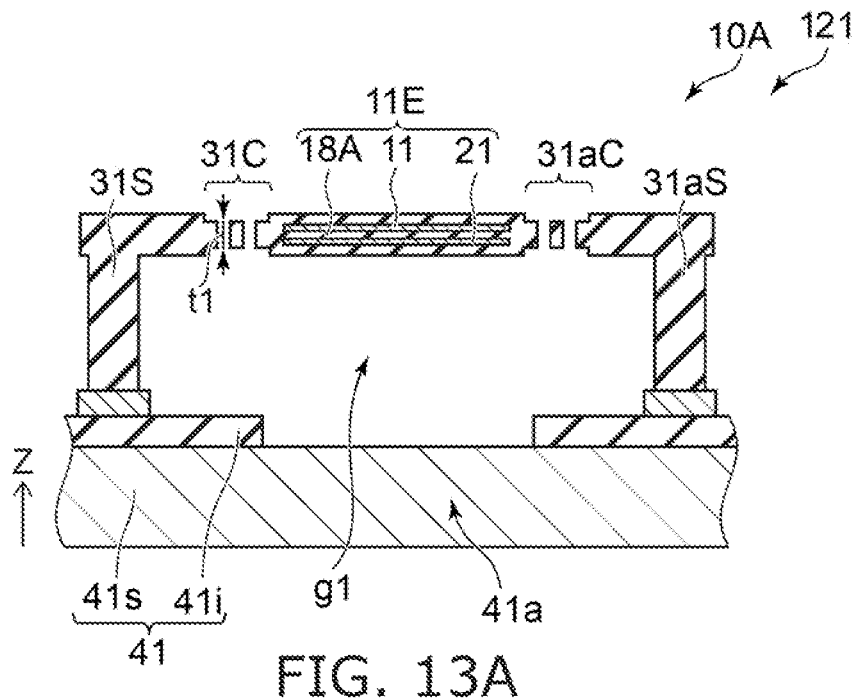
FIGS. 13A and 13B are schematic cross-sectional views illustrating a sensor according to the first embodiment.
Figure 13B:
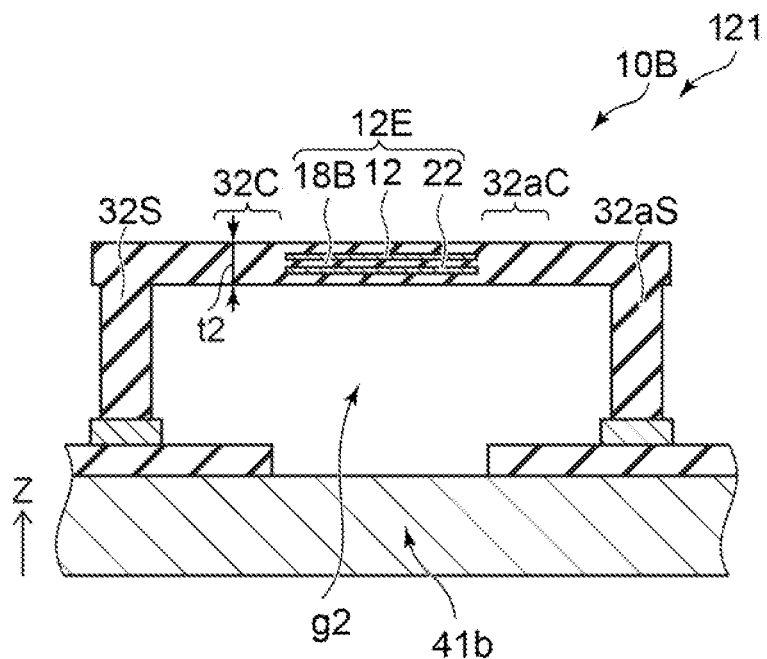

FIGS. 13A and 13B are schematic cross-sectional views illustrating a sensor according to the first embodiment.

FIG. 13A illustrates the first detection element 11E. FIG. 13B illustrates the second detection element 12E. As shown in FIGS. 13A and 13B, in a sensor 121 according to the embodiment, the thickness of the first connection part 31C and the thickness of the second connection part 32C are different from each other. Except for this, the configuration of the sensor 121 may be the same as that of the sensor 110, for example.

As shown in FIG. 13A, in the sensor 121 according to the embodiment, the first connection part 31C has a first connection part thickness t1. The first connection part thickness t1 is the thickness of the first connection part 31C in the first direction (Z-axis direction).

As shown in FIG. 13B, the second connection part 32C has a second connection part thickness t2. The second connection part thickness t2 is the thickness of the second connection part 32C in the first direction (Z-axis direction). The second connection part thickness t2 is different from the first connection part thickness t1. This thickness difference provides a difference in the thermal resistance of the connection part. For example, the difference in heat dissipation characteristics through the connection part can be used.

Figure 14A:
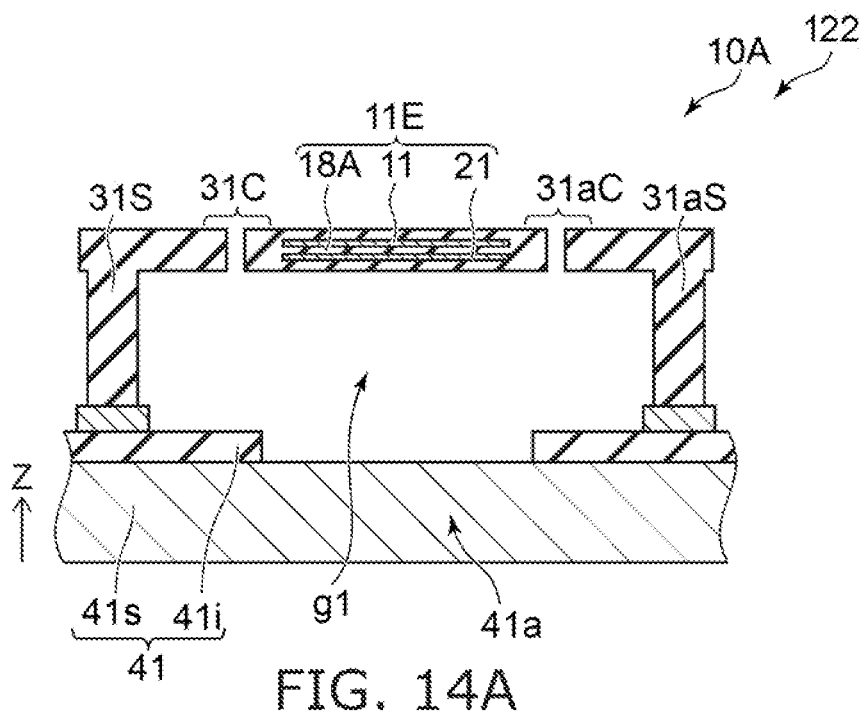
FIGS. 14A and 14B are schematic cross-sectional views illustrating a sensor according to the first embodiment.
Figure 14B:
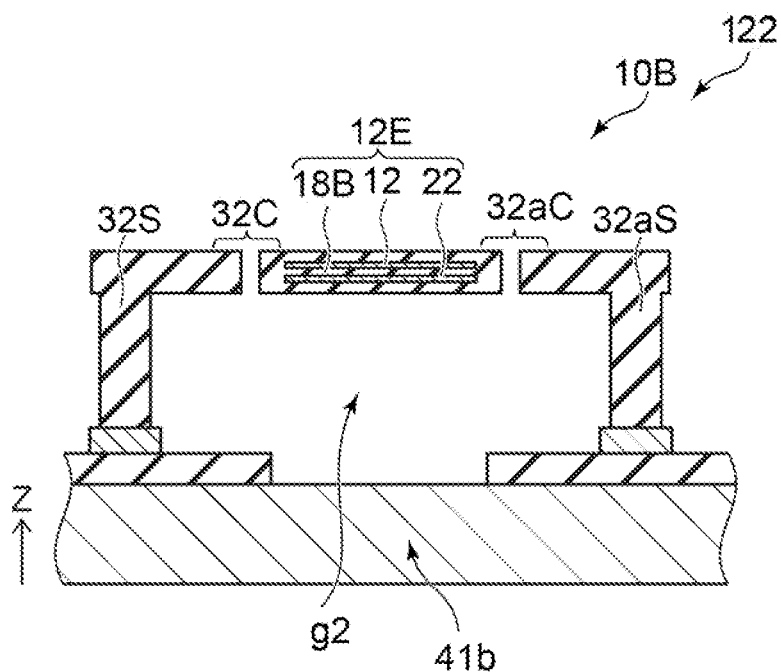

FIGS. 14A and 14B are schematic cross-sectional views illustrating a sensor according to the first embodiment.

FIG. 14A illustrates the first detection element 11E. FIG. 14B illustrates the second detection element 12E. In a sensor 122 according to the embodiment shown in FIGS. 14A and 14B, the material of the first connection part 31C and the material of the second connection part 32C are different from each other. Except for this, the configuration of the sensor 122 may be the same as that of the sensor 110, for example.

In sensor 122, first connection part 31C includes a first connection part material. The second connection part 32C includes a second connection part material different from the first connection part material. This material difference provides a difference in thermal resistance of the connection part. For example, the difference in heat dissipation characteristics through the connection can be used.

At least two of the configurations described above with respect to sensors 111 and 120-122 may be combined.

In the embodiment, as already described, the first detection part 10A includes the first area S1 of the first detection element 11E, the first connection part length LC1 of the first connection part 31C, and the first connection part width w1 of the first connection part 31C, the first connection part thickness t1 of the first connection part 31C, the first connection part material of the first connection part 31C, and the first distance d1. The first distance d1 is the distance between the first base region 41a and the first detection element 11E.

The second detection part 10B has at least one of the second area S2 different from the first area S1 of the second detection element 12E, the second connection part length LC2 different from the first connection part length LC1 of the second connection part 32C, the second connection part width w2 different from the first connection part width w1 of the connection part 32C, the second connection part thickness t2 different from the first connection part thickness t1 of the second connection part 32C, the second connection material different from the first connection part material of the second connection part 32c, or the second distance d2 different from the first distance d1. The second distance d2 is the distance between the second base region 41b and the second detection element 12E.

With such a configuration, it is possible to detect the concentration of the detection target substance with higher accuracy. According to the embodiment, it is possible to provide a sensor whose characteristics can be improved. For example, the concentration of each of multiple substances of different types and the flow rate of the detection target gas 81 can be detected with high accuracy.

The first area S1 is the area of the first detection element 11E on the plane crossing the first direction (Z-axis direction) from the first base region 41a to the first detection element 11E. The second area S2 is the area of the second detection element 12E on this plane.

The first connection part length LC1 is the length of the first connection part 31C along the first connection part path between the first support part 31S and the first detection element 11E. The first connection part width w1 is the width of the first connection part 31C in the direction crossing the first connection part path. The first connection part thickness t1 is the thickness of the first connection part 31C in the first direction.

The second connection part length LC2 is the length of the second connection part 32C along the second connection part path between the second support part 32S and the second detection element 12E. The second connection part width w2 is the width of the second connection part 32C in the direction crossing the second connection part path. The second connection part thickness t2 is the thickness of the second connection part 32C in the first direction.

The first distance d1 is the distance along the first direction between the first base region 41a and the first detection element 11E. The second distance d2 is the distance along the first direction between the second base region 41b and the second detection element 12E.

Second Embodiment

The second embodiment relates to a gas conversion system.

Figure 15:
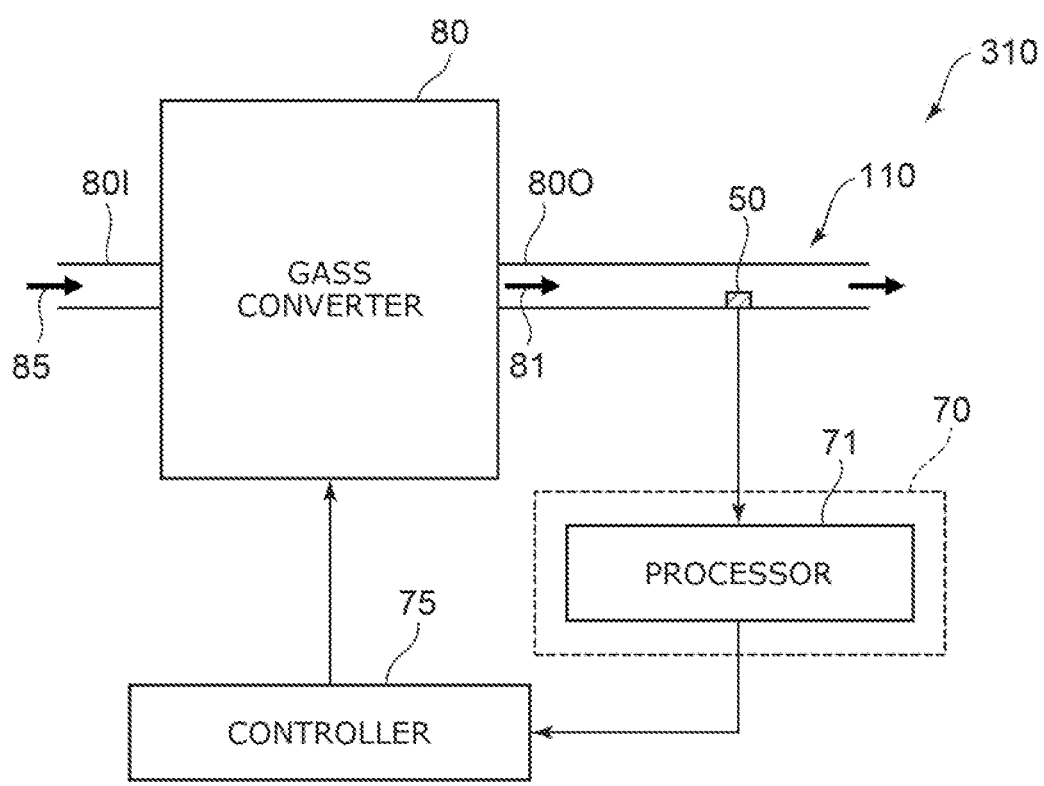
FIG. 15 is a schematic view illustrating a gas conversion system according to the second embodiment.

FIG. 15 is a schematic view illustrating a gas conversion system according to the second embodiment.

As shown in FIG. 15, a gas conversion system 310 according to the embodiment includes the sensor (for example, the sensor 110) according to the first embodiment and a gas conversion part 80. The gas conversion part 80 can convert a raw material gas 85 into the detection target gas 81.

For example, the gas conversion part 80 includes an inflow port 80I and an outflow port 80O. A raw material gas 85 is introduced from the inflow port 80I. In one example, the raw material gas 85 is carbon dioxide. In the gas conversion part 80, the raw material gas 85 is converted into the detection target gas 81. The detection target gas 81 may include, for example, methane. The detection target gas 81 may include water, for example. The detection target gas 81 may include, for example, hydrogen. The detection target gas 81 may include, for example, carbon monoxide. The detection target gas 81 may include, for example, residual carbon dioxide.

A detection element part 50 included in the sensor 110 is provided in a pipe of the outflow port 80O. The detection element part 50 includes the first detection part 10A, the second detection part 10B, the third detection part 10C, and the base 41 described above. For example, the detection target gas 81 is detected by the sensor 110. The controller 70 includes, for example, a processor 71. In the processor 71, for example, calculations regarding the first formula and the second formula are performed. The processor 71 derives the concentration of the detection target gas 81 and the flow rate of the detection target gas 81. The concentration of the detection target gas 81 includes the concentrations of each of the multiple types of detection target substances.

As shown in FIG. 15, a gas conversion system 310 may further include a gas conversion controller 75. The gas conversion controller 75 can control the gas conversion part 80 based on at least one of the above concentration derived by the controller 70 and the above flow rate. The operation of the gas conversion part 80 can be controlled with high accuracy. Efficient gas conversion can be performed.

Embodiments may include the following configurations (for example, technical proposals).

Configuration 1

A sensor, comprising:
a base including a first base region, a second base region, and a third base region;
a first detection part including a first support part, a first connection part, and a first detection element, the first support part being fixed to the base, the first connection part being supported by the first support part, the first connection part supporting the first detection element, a first gap being provided between the first base region and the first detection element, the first detection part having a first area of the first detection element, a first connection part length of the first connection part, a first connection part width of the first connection part, a first connection part thickness of the first connection part, a first connection part material of the first connection part, and a first distance, the first distance being a distance between the first base region and the first detection element;
a second detection part including a second support part, a second connection part, and a second detection element, the second support part being fixed to the base, the second connection part being supported by the second support part, the second connection part supporting the second detection element, a second gap being provided between the second base region and the second detection element, the second detection part including at least one of a second area different from the first area of the second detection element, a second connection part length different from the first connection part length of the second connection part, a second connection part width different from the first connection part width of the second connection part, a second connection part thickness different from the first connection part thickness of the second connection part, a second connection part material different from the first connection part material of the second connection part, or a second distance different from the first distance, the second distance being a distance between the second base region and the second detection element; and
a third detection part including a third detection element, the third detection element including a third resistance member, a third other resistance member, and a third conductive member, the third conductive member being between the third resistance member and the third other resistance member, a third gap being provided between the third base region and the third detection element.

Configuration 2

The sensor according to Configuration 1, wherein
the first area is an area of the first detection element in a plane crossing a first direction from the first base region to the first detection element,
the second area is an area of the second detection element in the plane,
the first connection part length is a length of the first connection part along a first connection part path between the first support part and the first detection element, the first connection part width is a width of the first connection part in a direction crossing the first connection part path, the first connection part thickness is a thickness of the first connection part in the first direction,
the second connection part length is a length of the second connection part along a second connection part path between the second support part and the second detection element, the second connection width is a width of the second connection part in a direction crossing the second connection part path, the second connection part width is a thickness of the second connection part in the first direction, the first distance is a distance along the first direction between the first base region and the first detection element, and the second distance is a distance along the first direction between the second base region and the second detection element.

Configuration 3

The sensor according to Configuration 1 or 2, wherein
the first gap is further provided between the first connection part and the first base region, and
the second gap is further provided between the second connection part and the second base region.

Configuration 4

The sensor according to any one of Configurations 1 to 3, wherein
the second area is different from the first area.

Configuration 5

The sensor according to any one of Configurations 1 to 4, wherein
the second connection part length is different from the first connection part length.

Configuration 6

The sensor according to any one of Configurations 1 to 5, wherein
the second connection part width is different from the first connection part width.

Configuration 7

The sensor according to any one of Configurations 1 to 6, wherein
the second distance is different from the first distance.

Configuration 8

The sensor according to any one of Configurations 1 to 7, wherein
the first detection element includes a first resistance member, a first conductive member, and a first insulating member,
at least a part of the first insulating member is between the first resistance member and the first conductive member,
the second detection element includes a second resistance member, a second conductive member, and a second insulating member, and
at least a part of the second insulating member is between the second resistance member and the second conductive member.

Configuration 9

The sensor according to any one of Configurations 1 to 8, wherein
the third detection element further includes a third insulating member, and
at least a part of the third insulating member is between the third resistance member and the third conductive member, and between the third other resistance member and the third conductive member.

Configuration 10

The sensor according to any one of Configurations 1 to 9, wherein
the first base region, the second base region, and the third base region are continuous with each other.

Configuration 11

The sensor according to any one of Configurations 1 to 9, wherein
at least two of the first base region, the second base region, and the third base region are discontinuous.

Configuration 12

The sensor according to any one of Configurations 1 to 11, wherein
the base includes a semiconductor.

Configuration 13

The sensor according to any one of Configurations 1 to 12, wherein
a direction from the third resistance member to the third other resistance member crosses a direction from the first detection part to the second detection part.

Configuration 14

The sensor according to any one of Configurations 1 to 12, wherein
a direction from the third resistance member to the third other resistance member is along a direction from the first detection part to the second detection part.

Configuration 15

The sensor according to any one of Configurations 1 to 12, further comprising:
a housing including an inflow port and an outflow port,
the first detection element, the second detection element, and the third detection element being provided between the base and at least a part of the housing.

Configuration 16

The sensor according to Configuration 15, wherein
a direction from the third resistance member to the third other resistance member is along a direction of a flow of a detection target gas flowing from the inflow port to the outflow port.

Configuration 17

The sensor according to Configuration 8, further comprising:
a controller,
the controller being configured to derive a concentration of a detection target gas and a flow rate of the detection target gas based on first detection data obtained from the first detection part, second detection data obtained from the second detection part, and third detection data obtained from the third detection part.

Configuration 18

The sensor according to Configuration 17, wherein
the first detection data includes a first value corresponding to an electrical resistance of the first resistance member,
the second detection data includes a second value corresponding to an electrical resistance of the second resistance member,
the third detection data includes a third value corresponding to an electrical resistance of the third resistance member, and a third other value corresponding to an electrical resistance of the third other resistance member, and
the first value, the second value, the third value, and the third other value change according to the concentration, the flow rate.

Configuration 19

A gas conversion system, comprising:
the sensor according to Configuration 17 or 18; and
a gas conversion part configured to convert a raw material gas to the detection target gas.

Configuration 20

The gas conversion system according to Configuration 19, further comprising:
a gas conversion controller,
the gas conversion controller being configured to control the gas conversion part based on at least one of the concentration or the flow rate derived from the controller.

According to the embodiment, it is possible to provide a sensor whose characteristics can be improved.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as bases, detection parts, controllers etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors, semiconductor wafers, and gas conversion systems practicable by an appropriate design modification by one skilled in the art based on the sensors, and the gas conversion systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a base including a first base region, a second base region, and a third base region;
a first detection part including a first support part, a first connection part, and a first detection element, the first support part being fixed to the base, the first connection part being supported by the first support part, the first connection part supporting the first detection element, a first gap being provided between the first base region and the first detection element, the first detection part having a first area of the first detection element, a first connection part length of the first connection part, a first connection part width of the first connection part, a first connection part thickness of the first connection part, a first connection part material of the first connection part, and a first distance, the first distance being a distance between the first base region and the first detection element;
a second detection part including a second support part, a second connection part, and a second detection element, the second support part being fixed to the base, the second connection part being supported by the second support part, the second connection part supporting the second detection element, a second gap being provided between the second base region and the second detection element, the second detection part including a second area, a second connection part length, a second connection part width, a second connection part thickness, a second connection part material, and a second distance, the second distance being a distance between the second base region and the second detection element, the first detection part and the second detection part satisfying at least one of a first condition, a second condition, a third condition, a fourth condition, a fifth condition, and a sixth condition, the second area being different from the first area in the first condition, the second connection part length being different from the first connection part length in the second condition, the second connection part width being different from the first connection part width in the third condition, the second connection part thickness being different from the first connection part thickness in the fourth condition, the second connection part material being different from the first connection part material in the fifth condition, and the second distance being different from the first distance in the sixth condition;
a third detection part including a third detection element, the third detection element including a third resistance member, a third other resistance member, and a third conductive member, the third conductive member being between the third resistance member and the third other resistance member, a third gap being provided between the third base region and the third detection element; and
a controller being electrically connected to a first resistance member of the first detection element with a first current path, being electrically connected to a second resistance member of the second detection element with a second current path, and being electrically connected to the third conductive member with a third current path, the first current path, the second current path, and the third current path being independent from each other, and the controller being configured to obtain first detection data from the first detection part, second detection data from the second detection part, and third detection data from the third detection part.

2. The sensor according to claim 1, wherein
the first area is an area of the first detection element in a plane crossing a first direction from the first base region to the first detection element, the second area is an area of the second detection element in the plane, the first connection part length is a length of the first connection part along a first connection part path between the first support part and the first detection element, the first connection part width is a width of the first connection part in a direction crossing the first connection part path, the first connection part thickness is a thickness of the first connection part in the first direction, the second connection part length is a length of the second connection part along a second connection part path between the second support part and the second detection element, the second connection width is a width of the second connection part in a direction crossing the second connection part path, the second connection part width is a thickness of the second connection part in the first direction, the first distance is a distance along the first direction between the first base region and the first detection element, and the second distance is a distance along the first direction between the second base region and the second detection element.

3. The sensor according to claim 1, wherein
the first gap is further provided between the first connection part and the first base region, and
the second gap is further provided between the second connection part and the second base region.

4. The sensor according to claim 1, wherein
the second area is different from the first area.

5. The sensor according to claim 1, wherein
the second connection part length is different from the first connection part length.

6. The sensor according to claim 1, wherein
the second connection part width is different from the first connection part width.

7. The sensor according to claim 1, wherein
the second distance is different from the first distance.

8. The sensor according to claim 1, wherein
the first detection element includes a first resistance member, a first conductive member, and a first insulating member, at least a part of the first insulating member is between the first resistance member and the first conductive member, the second detection element includes a second resistance member, a second conductive member, and a second insulating member, and at least a part of the second insulating member is between the second resistance member and the second conductive member.

9. The sensor according to claim 1, wherein
the third detection element further includes a third insulating member, and
at least a part of the third insulating member is between the third resistance member and the third conductive member, and between the third other resistance member and the third conductive member.

10. The sensor according to claim 1, wherein
the first base region, the second base region, and the third base region are continuous with each other.

11. The sensor according to claim 1, wherein
at least two of the first base region, the second base region, and the third base region are discontinuous.

12. The sensor according to claim 1, wherein
the base includes a semiconductor.

13. The sensor according to claim 1, wherein
a direction from the third resistance member to the third other resistance member crosses a direction from the first detection part to the second detection part.

14. The sensor according to claim 1, wherein
a direction from the third resistance member to the third other resistance member is along a direction from the first detection part to the second detection part.

15. The sensor according to claim 1, further comprising:
a housing including an inflow port and an outflow port,
the first detection element, the second detection element, and the third detection element being provided between the base and at least a part of the housing.

16. The sensor according to claim 15, wherein
a direction from the third resistance member to the third other resistance member is along a direction of a flow of a detection target gas flowing from the inflow port to the outflow port.

17. The sensor according to claim 8, further comprising:
a controller,
the controller being configured to derive a concentration of a detection target gas and a flow rate of the detection target gas based on the first detection data obtained from the first detection part, the second detection data obtained from the second detection part, and the third detection data obtained from the third detection part.

18. The sensor according to claim 17, wherein
the first detection data includes a first value corresponding to an electrical resistance of the first resistance member,
the second detection data includes a second value corresponding to an electrical resistance of the second resistance member,
the third detection data includes a third value corresponding to an electrical resistance of the third resistance member, and a third other value corresponding to an electrical resistance of the third other resistance member, and
the first value, the second value, the third value, and the third other value change according to the concentration, the flow rate.

19. A gas conversion system, comprising:
the sensor according to claim 17; and
a gas conversion part configured to convert a raw material gas to the detection target gas.

20. The system according to claim 19, further comprising:
a gas conversion controller,
the gas conversion controller being configured to control the gas conversion part based on at least one of the concentration or the flow rate derived from the controller.

21. The sensor according to claim 1, wherein
the first detection part, the second detection part, and the third detection part are arranged so that the same detection target gas flows through the first detection part, the second detection part, and the third detection part.

22. The sensor according to claim 1, wherein a first detection data is obtained from the first detection part, a second detection data is obtained from the second detection part, a third detection data is obtained from the third detection part, a first concentration of a first gas contained in a detection target gas, a second concentration of a second gas contained in the detection target gas, and a flow rate of the detection target gas are derived, the first concentration, the second concentration, and the flow rate satisfy a simultaneous equation comprising a first relational expression in which the first detection data is represented by a first function, a second relational expression in which the second detection data is represented by a second function, and a third relational expression in which the third detection data is represented by a third function, the first function has the first concentration, the second concentration, and the flow rate as variables, the second function has the first concentration, the second concentration, and the flow rate as variables, and the third function has the first concentration, the second concentration, and the flow rate as variables.

23. The sensor according to claim 1, wherein a first detection data is obtained from the first detection part, a second detection data is obtained from the second detection part, a third detection data is obtained from the third detection part, by solving a simultaneous equation comprising a first relational expression in which the first detection data is represented by a first function, a second relational expression in which the second detection data is represented by a second function, and a third relational expression in which the third detection data is represented by a third function, a first concentration of a first gas contained in a detection target gas, a second concentration of a second gas contained in the detection target gas, and a flow rate of the detection target gas are derived, the first function has the first concentration, the second concentration, and the flow rate as variables, the second function has the first concentration, the second concentration, and the flow rate as variables, and the third function has the first concentration, the second concentration, and the flow rate as variables.

24. The sensor according to claim 1, wherein the first detection part functions at least as a first concentration sensor, the second detection part functions at least as a second concentration sensor, and the third detection part functions at least as a flow rate sensor.

\* \* \* \* \*